United States Patent
Kim et al.

(10) Patent No.: US 12,464,086 B2
(45) Date of Patent: Nov. 4, 2025

(54) METHOD FOR TRANSMITTING/RECEIVING VIDEO DATA AND DEVICE THEREFOR

(71) Applicant: LG ELECTRONICS INC., Seoul (KR)

(72) Inventors: Dokyun Kim, Seoul (KR); Seunghyun Yoo, Seoul (KR); Yoonjong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 53 days.

(21) Appl. No.: 18/290,525

(22) PCT Filed: May 20, 2022

(86) PCT No.: PCT/KR2022/007247
§ 371 (c)(1),
(2) Date: Nov. 14, 2023

(87) PCT Pub. No.: WO2022/245182
PCT Pub. Date: Nov. 24, 2022

(65) Prior Publication Data
US 2024/0259523 A1    Aug. 1, 2024

(30) Foreign Application Priority Data

May 20, 2021 (KR) .................. 10-2021-0064691
Jun. 1, 2021 (KR) .................. 10-2021-0071098
Jan. 19, 2022 (KR) .................. 10-2022-0008004

(51) Int. Cl.
*H04N 7/025* (2006.01)

(52) U.S. Cl.
CPC .................. *H04N 7/025* (2013.01)

(58) Field of Classification Search
CPC .................................... H04N 7/025
See application file for complete search history.

(56) References Cited

U.S. PATENT DOCUMENTS 9,787,725 B2 * 10/2017 Huang .................... H04L 65/00
2004/0240846 A1 * 12/2004 Cookson ............... G06T 3/4023
386/245

(Continued)

FOREIGN PATENT DOCUMENTS

KR    10-2017-0016845    2/2017
KR    10-2017-0096559    8/2017

(Continued)

OTHER PUBLICATIONS

PCT International Application No. PCT/KR2022/007247, International Search Report dated Aug. 26, 2022, 4 pages.

*Primary Examiner* — Henry Tsai
*Assistant Examiner* — Aurangzeb Hassan
(74) *Attorney, Agent, or Firm* — LEE, HONG, DEGERMAN, KANG & WAIMEY

(57) ABSTRACT

The present specification proposes a method for a source device receiving capability information of a sink device. More specifically, the method comprises the steps of: transmitting, to a sink device, a message requesting for the reading of capability information of the sink device; receiving, from the sink device, first capability information of the sink device; on the basis of a capability information version of the sink device which is readable by a source device, carrying out a version change procedure for changing the capability information version of the sink device; and, on the basis of the version change procedure, receiving second capability information of the sink device, wherein the version of the second capability information is a higher than the version of the first capability information.

17 Claims, 16 Drawing Sheets

(56) References Cited

U.S. PATENT DOCUMENTS

| | | | | |
|---|---|---|---|---|
| 2013/0003621 | A1* | 1/2013 | Huang | H04L 65/00 370/310 |
| 2017/0195722 | A1* | 7/2017 | Seo | H04N 21/440218 |
| 2021/0105530 | A1* | 4/2021 | Lassure | H04N 21/43079 |
| 2021/0243491 | A1* | 8/2021 | Kraegeloh | H04N 21/43072 |
| 2022/0109913 | A1* | 4/2022 | Huang | H04N 21/234309 |
| 2022/0417468 | A1* | 12/2022 | Nakahama | H04N 7/015 |

FOREIGN PATENT DOCUMENTS

| | | |
|---|---|---|
| KR | 10-1867828 | 6/2018 |
| KR | 10-1872042 | 6/2018 |
| KR | 10-2019-0129579 | 11/2019 |

\* cited by examiner

[FIG. 1]
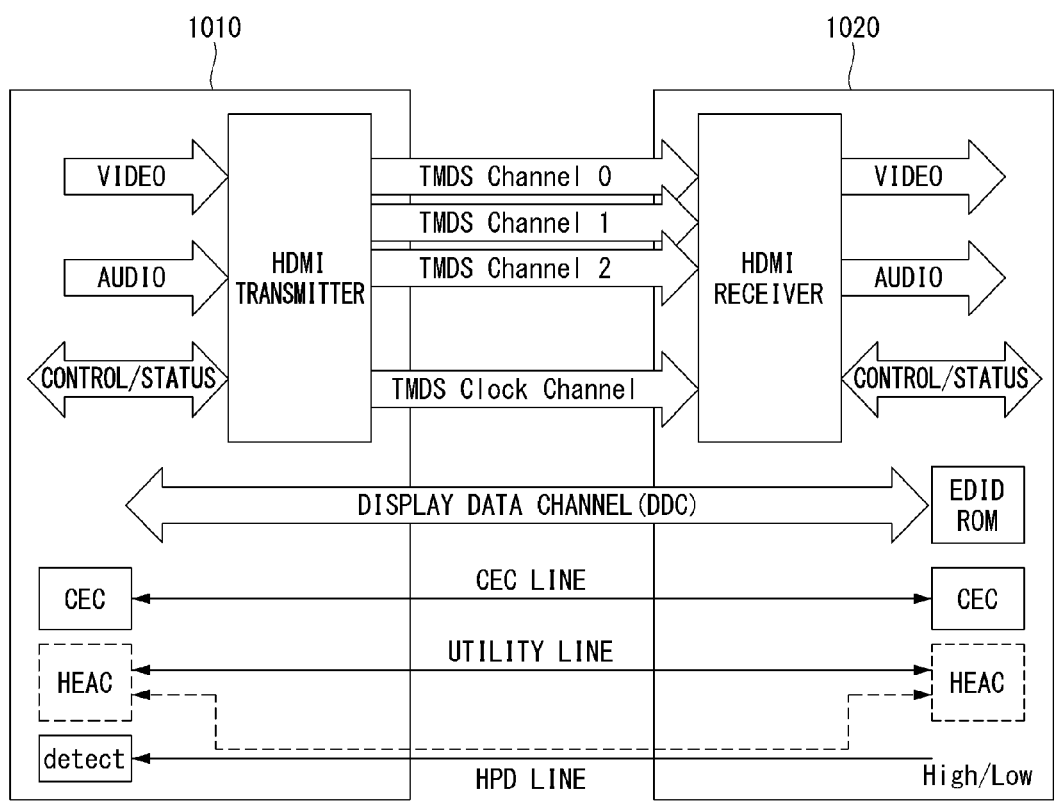

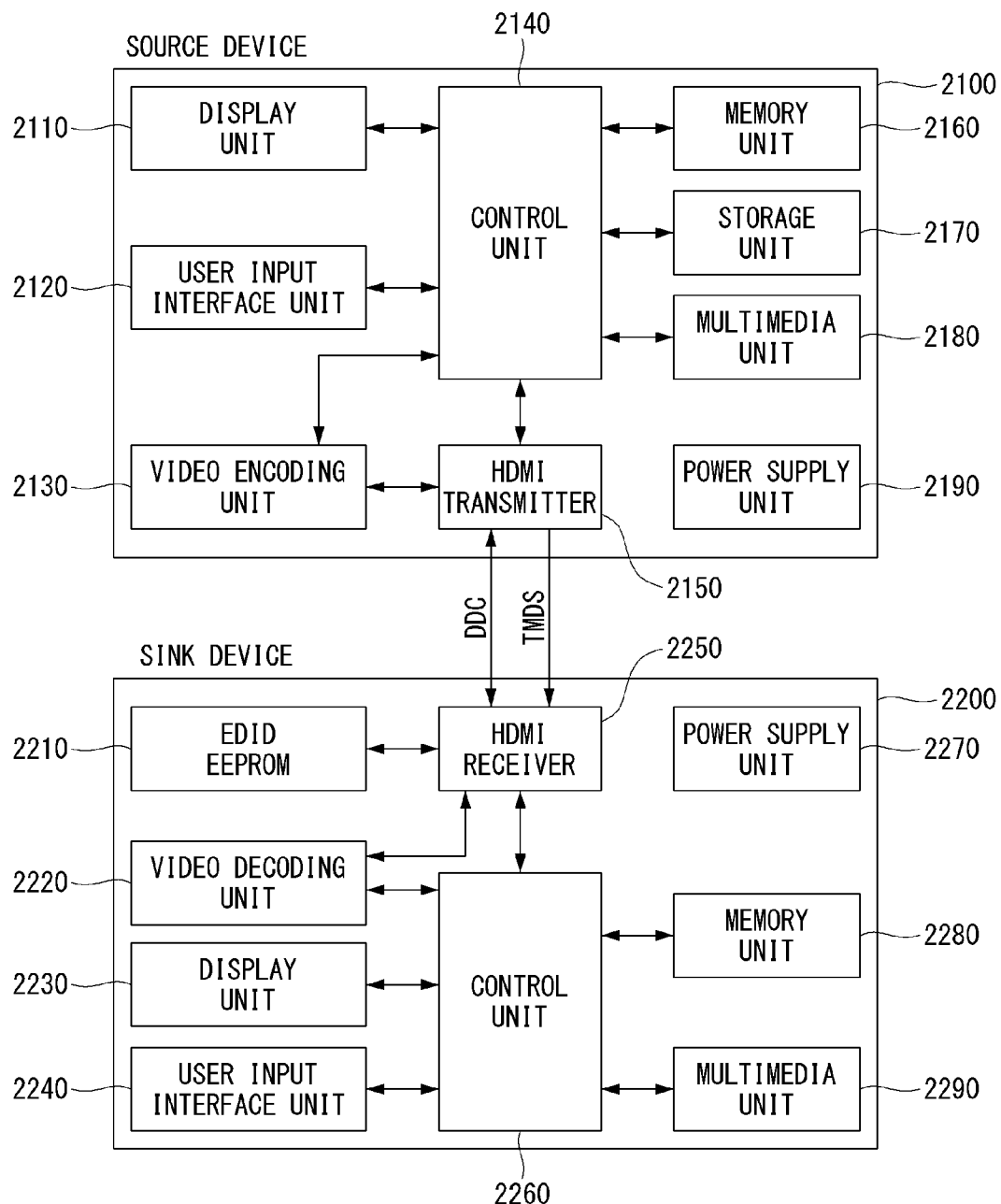
[FIG. 2]

[FIG. 3]

| Address | No. Bytes | Description |
|---|---|---|
| 00h ~ 07h | 8 | Header information.<br>Fixed to 00 FF FF FF FF FF FF 00. |
| 08h ~ 11h | 10 | Vendor/Product identification. Manufacturer, Product code, Serial number, and Date of Manufacture |
| 12h ~ 13h | 2 | EDID structure version/revision |
| 14h ~ 18h | 5 | Basic Display Parameters/Features. Video input definition (analog or digital),Max. Horizontal Image Size, Max. Vertical Image Size, Display Transfer Characteristic(Gamma), Feature Support(Standby, Suspend, Display Type, Standard Default Color space (sRGB), Preferred Timing Mode support and so on) |
| 19h ~ 22h | 10 | Color Characteristics. Information related to color and white point. Express in terms of xy-coordinaes of red, green, blue, and white in the color space. |
| 23h ~ 25h | 3 | Established Timings.<br>Describes commonly used timing mode |
| 26h ~ 35h | 16 | Standard Timings. Describes 8 standard timing descriptors, and one descriptor includes information about range of horizontal active pixel, image aspect ratio, and refresh rate (60 ~ 123 Hz). Timing not belonging to the established timing is described accoridng to the VESA DMT standard or usesthe timing informaiton calculated by using GTF. |
| 36h ~ 7Dh | 72 | Detailed Timing Descriptors. Describes detailed timing information about display resolution, and four descriptors are used. The first descriptor describes preferred detailed timing, the second descriptor describes secondary detailed timing or monitor additional information (serial number, range limites, and name). The remaining two descriptors include monitor additional information. Monitor range limit and name must be described. |
| 7Eh | 1 | Extension Flag. Specifies the number of additional EDID extensin blocks. |
| 7Fh | 1 | Checksum. |

[FIG. 4]

| Byte # | |
|---|---|
| 0 | Tag. 0x02 |
| 1 | Revision Number. 0x03 |
| 2 | Byte number offset d value at which Detailed Timing Descriptor (DTD) of 18 bytes starts |
| 3 | Indication of underscan, audio support, YCBCR 4:4:4 or YCBCR 4:2:2 support, the number of native DTDs supported. |
| 4 | Start of data block collection |
| d-1 | End of data block collection |
| d | Start of 18-byte DTD. Follows the EDID DTD format |
| d+(18*n)-1 | End of 18-byte DTD. n is the number of descriptors included |
| d+(18*n) | Beginning of Padding. 0x00 |
| 126 | End of Padding. 0x00 |
| 127 | Checksum. |

【FIG. 5】

(a) Video Data Block

| Byte # | Bits 5-7 | Bits 0-4 |
|---|---|---|
| 0 | Video Tag Code | The total number of bytes for Short Video Descriptor (L1) |
| 1 | CEA Short Video Descriptor 1 | |
| L1 | CEA Short Video Descriptor L1 | |

(b) Audio Data Block

| Byte # | Bits 5-7 | Bits 0-4 |
|---|---|---|
| 0 | Audio Tag Code | The total number of bytes for Short Audio Descriptor (L2) |
| 1~3 | CEA Short Audio Descriptor 1 | |
| 4~3*L2 | CEA Short Video Descriptor L2/3 | |

(c) Speaker Allocation Data Block

| Byte # | Bits 5-7 | Bits 0-4 |
|---|---|---|
| 0 | Speaker allocation Tag Code | The total number of bytes for Speaker Allocation (L3 = 3) |
| 1~3 | Speaker Allocation Data Block Payload | |

[FIG. 6]

| Byte / Bits # | 7 | 6 | 5 | 4 | 3 | 2 | 1 | 0 |
|---|---|---|---|---|---|---|---|---|
| 0 | Vendor Specific Tag Code (=3) | | | Length (=N) | | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=1) | | | | | | | |
| 5 | Max_TMDS_Character_Rate | | | | | | | |
| 6 | SCDC_Present | RR_Capable | Rsvd(0) | Rsvd(0) | LTE_340Mcsc_scramble | Independent_view | Dual_View | 3D_OSD_Disparity |
| 7 | Rsvd(0) | Rsvd(0) | Rsvd(0) | Rsvd(0) | Rsvd(0) | DC_48bit_420 | DC_36bit_420 | DC_30bit_420 |
| ...N | Reserved (0) | | | | | | | |

[FIG. 7]

(a) HF_VSIF Packet header

| Byte/Bits # | 7 | 6 | 5 | 4 | 3 | 2 | 1 | 0 |
|---|---|---|---|---|---|---|---|---|
| 0 | | | | Packet Type = 0x81 | | | | |
| 1 | | | | Version = 0x01 | | | | |
| 2 | 0 | 0 | 0 | | Length = Nv | | | |

(b) HF_VSIF Packet content

| Packet Byte # | 7 | 6 | 5 | 4 | 3 | 2 | 1 | 0 |
|---|---|---|---|---|---|---|---|---|
| PB0 | | | | Checksum | | | | |
| PB1 | | | | IEEE OUI, Third Octet (0xD8) | | | | |
| PB2 | | | | IEEE OUI, Second Octet (0x5D) | | | | |
| PB3 | | | | IEEE OUI, First Octet (0xC4) | | | | |
| PB4 | | | | Version(=1) | | | | |
| PB5 | Rsvd(0) | Rsvd(0) | Rsvd(0) | Rsvd(0) | Rsvd(0) | Rsvd(0) | Rsvd(0) | 3D_Valid |
| (PB6)* | | | 3D_F_Structure | | 3D_Additional_Info_Present | 3D_Disparity_Data_Present | 3D_Meta_present | Rsvd(0) |
| (PB7)* | | | 3D_F_Ext_Data | | | Rsvd(0) | | |
| (PB8)* | Rsvd(0) | Rsvd(0) | Rsvd(0) | 3D_Dual_view | 3D_ViewDependency | 3D_Preferred2DView | | |
| (PB9)* | | | 3D_DisparityData_Version | | | 3D_DisparityData_length(J) | | |
| (PB9+1)* | | | | 3D_DisparityData_1 | | | | |
| ... | | | | ... | | | | |
| (PB9+J)* | | | | 3D_DisparityData_J | | | | |
| (PBm)* | | | 3D_MetaData_type | | | 3D_MetaData_length(K) | | |
| (PBm+1)* | | | | 3D_Metadata_1 | | | | |
| ... | | | | ... | | | | |
| PBm+K)* | | | | 3D_Metadata_K | | | | |
| ...PB (Nv) | Rsvd(0) | Rsvd(0) | Rsvd(0) | Rsvd(0) | Rsvd(0) | Rsvd(0) | Rsvd(0) | Rsvd(0) |

[FIG. 8]

| Offset | R/W | Name |
|---|---|---|
| 0x01 | R | Sink Version |
| 0x02 | R/W | Source Version |
| 0x10 | R/W | Update_0 |
| 0x11 | R/W | Update_1 |
| 0x12-0x1F | R | Reserved for Update Related Uses |
| 0x20 | R/W | TMDS_Config |
| 0x21 | R | Scrambler_Status |
| 0x30 | R/W | Config_0 |
| 0x31-0x3F | R | Reserved for Configuration |
| 0x40 | R | Status_Flag_0 |
| 0x41 | R | Status_Flag_1 |
| 0x42-0x4F | R | Reserved for Status Related Uses |
| 0x50 | R | Err_Det_0_L |
| 0x51 | R | Err_Det_0_H |
| 0x52 | R | Err_Det_1_L |
| 0x53 | R | Err_Det_1_H |
| 0x54 | R | Err_Det_2_L |
| 0x55 | R | Err_Det_2_H |
| 0x56 | R | Err_Det_Checksum |
| 0xC0 | R/W | Test_Config_0 |
| 0xC1`0xCF | R | Reserved for test features |
| 0xD0 | R | Manufacturer IEEE OUI, Third Octet |
| 0xD1 | R | Manufacturer IEEE OUI, Second Octet |
| 0xD2 | R | Manufacturer IEEE OUI, First Octet |
| 0xD3-0xDD | R | Device ID |
| 0xDE-0xFF | R/W | Manufacturer Specific |
| All Remaining Offsets | R | Reserved |

[FIG. 9]
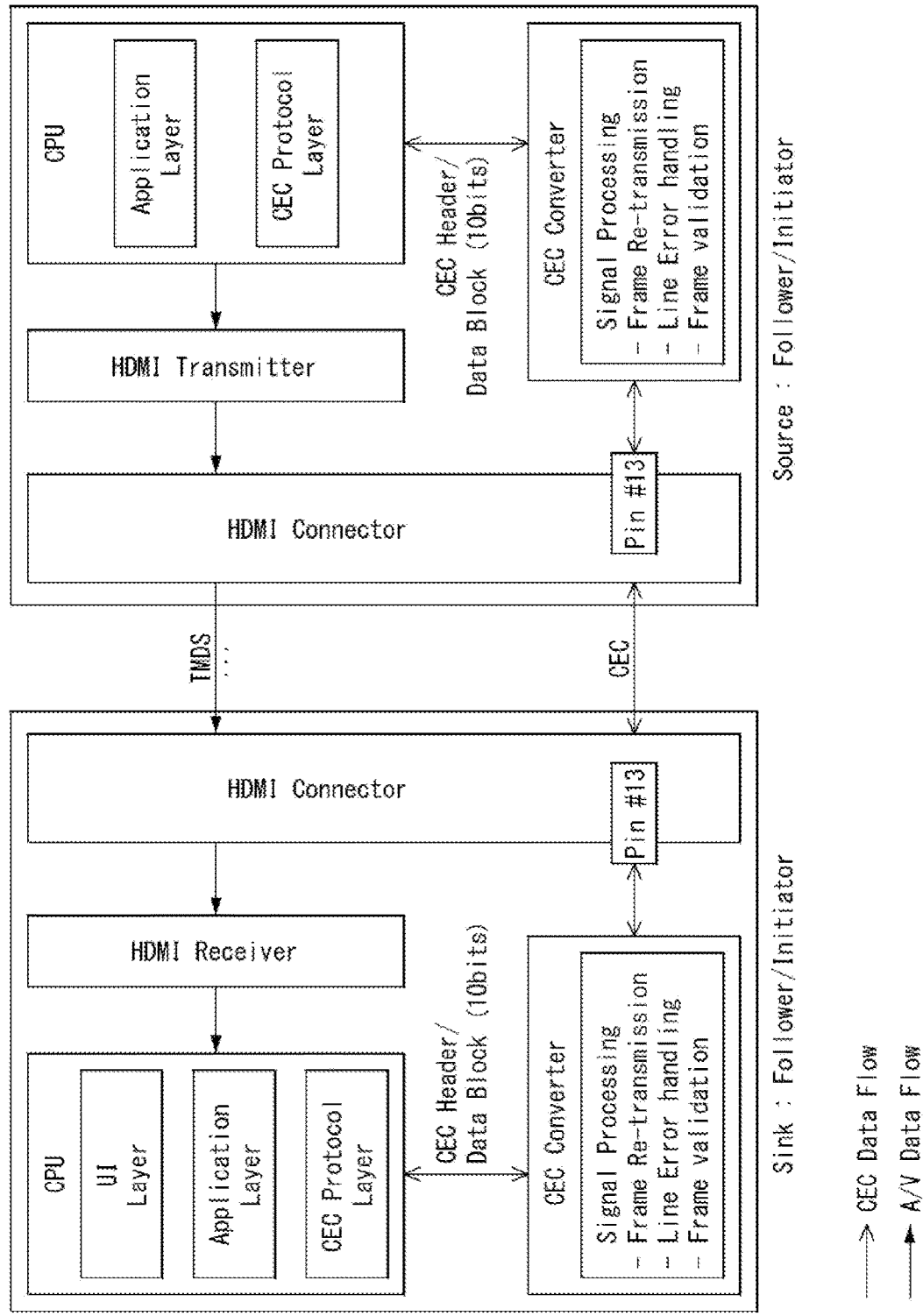

[FIG. 10]
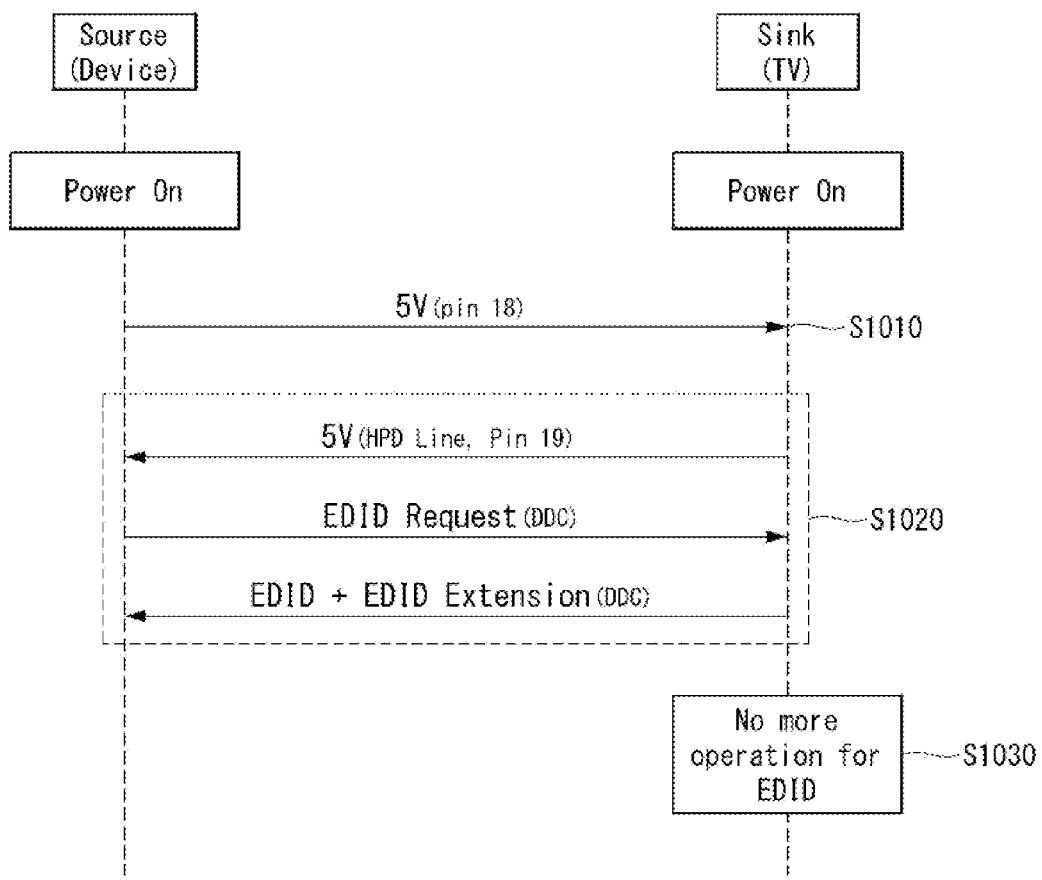

[FIG. 11]
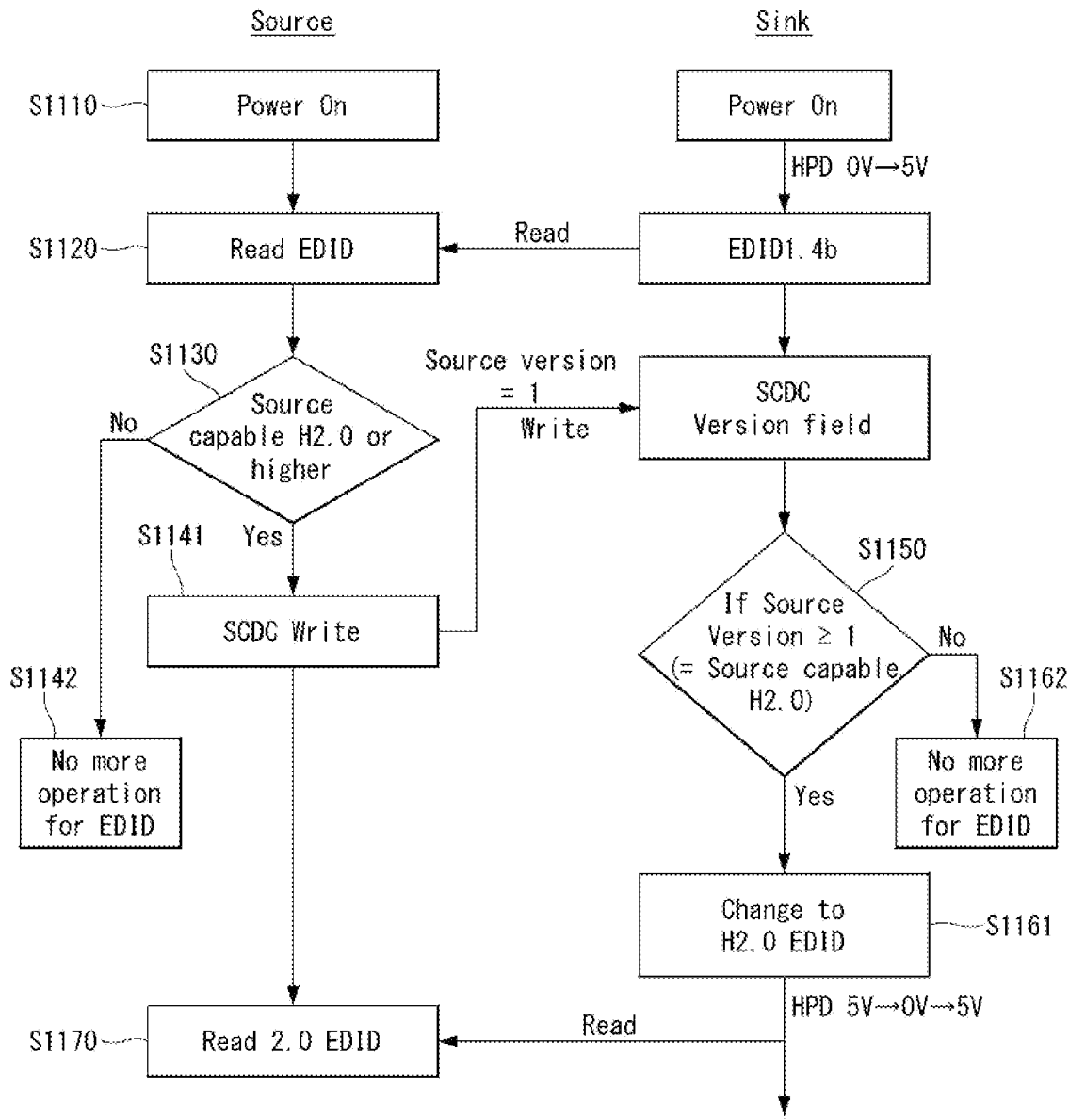

[FIG. 12]
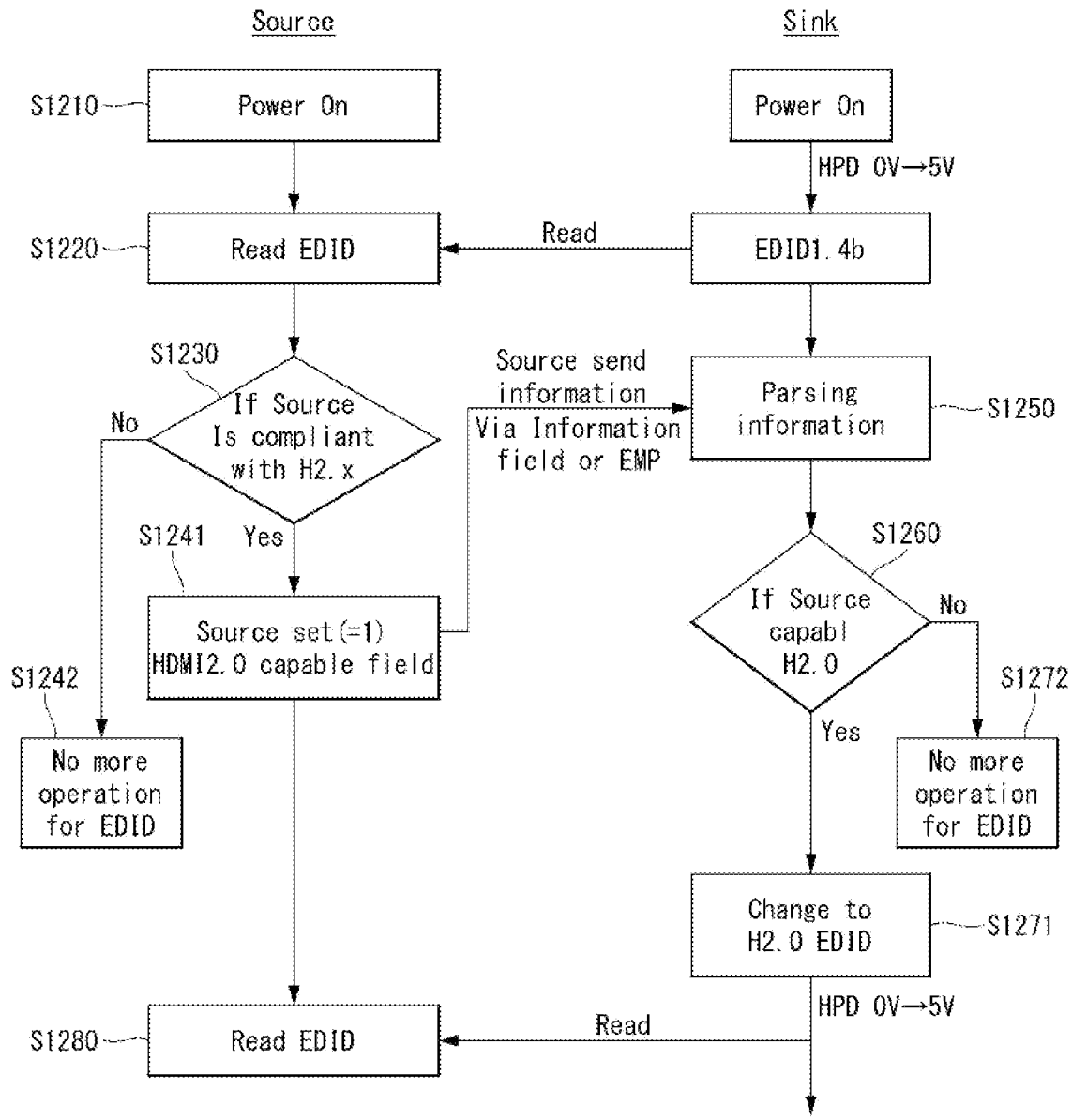

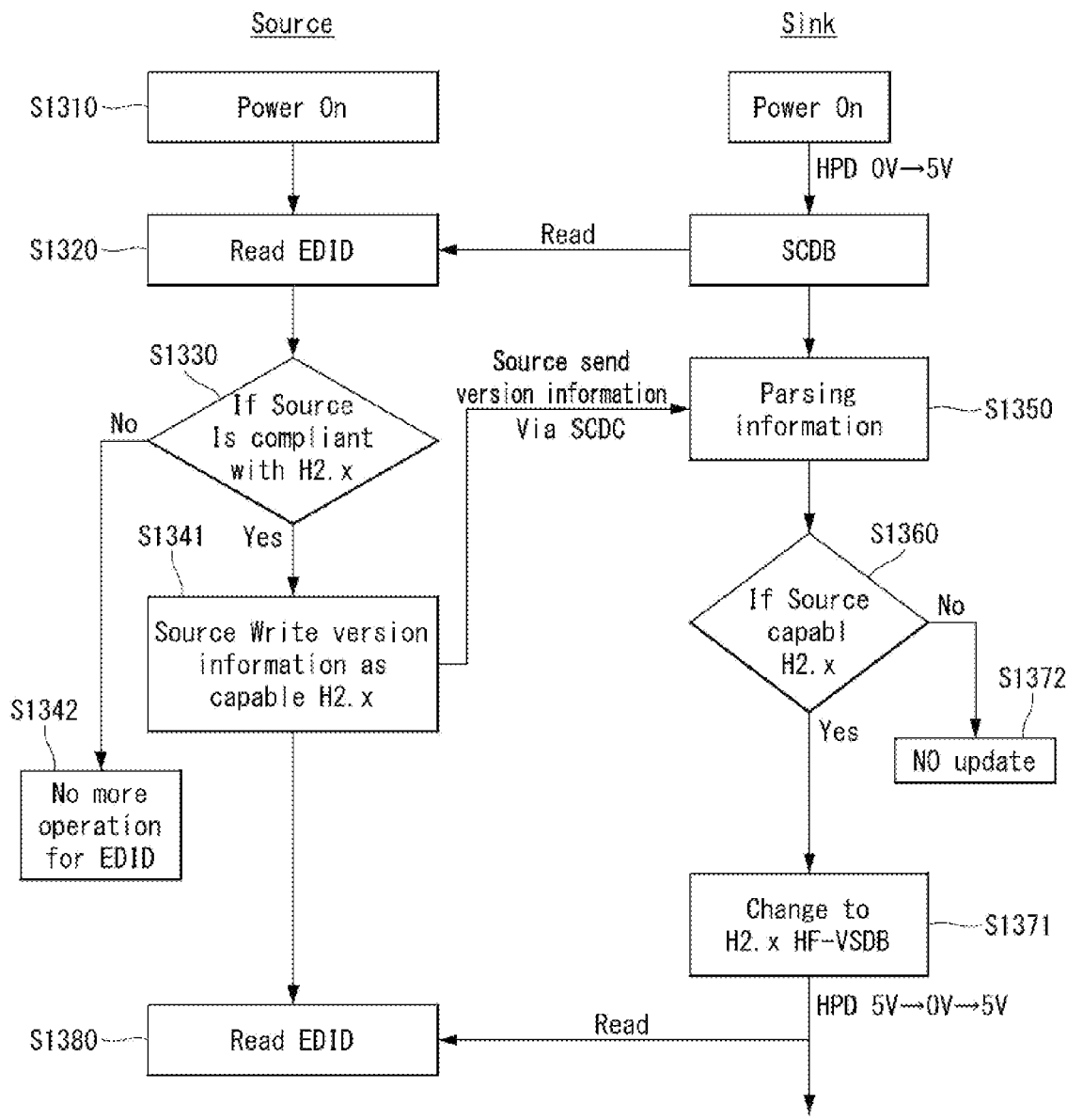
[FIG. 13]

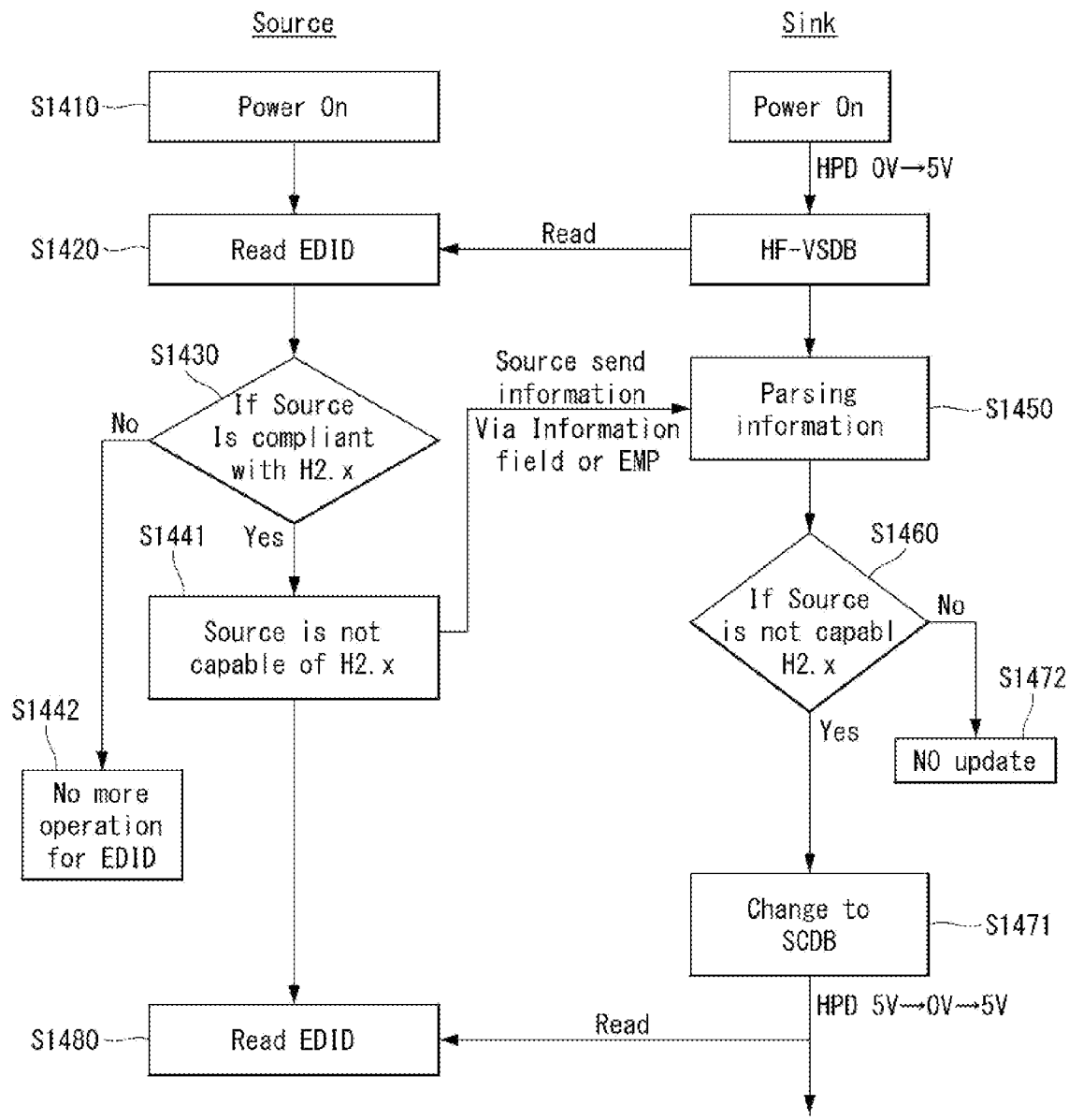
[FIG. 14]

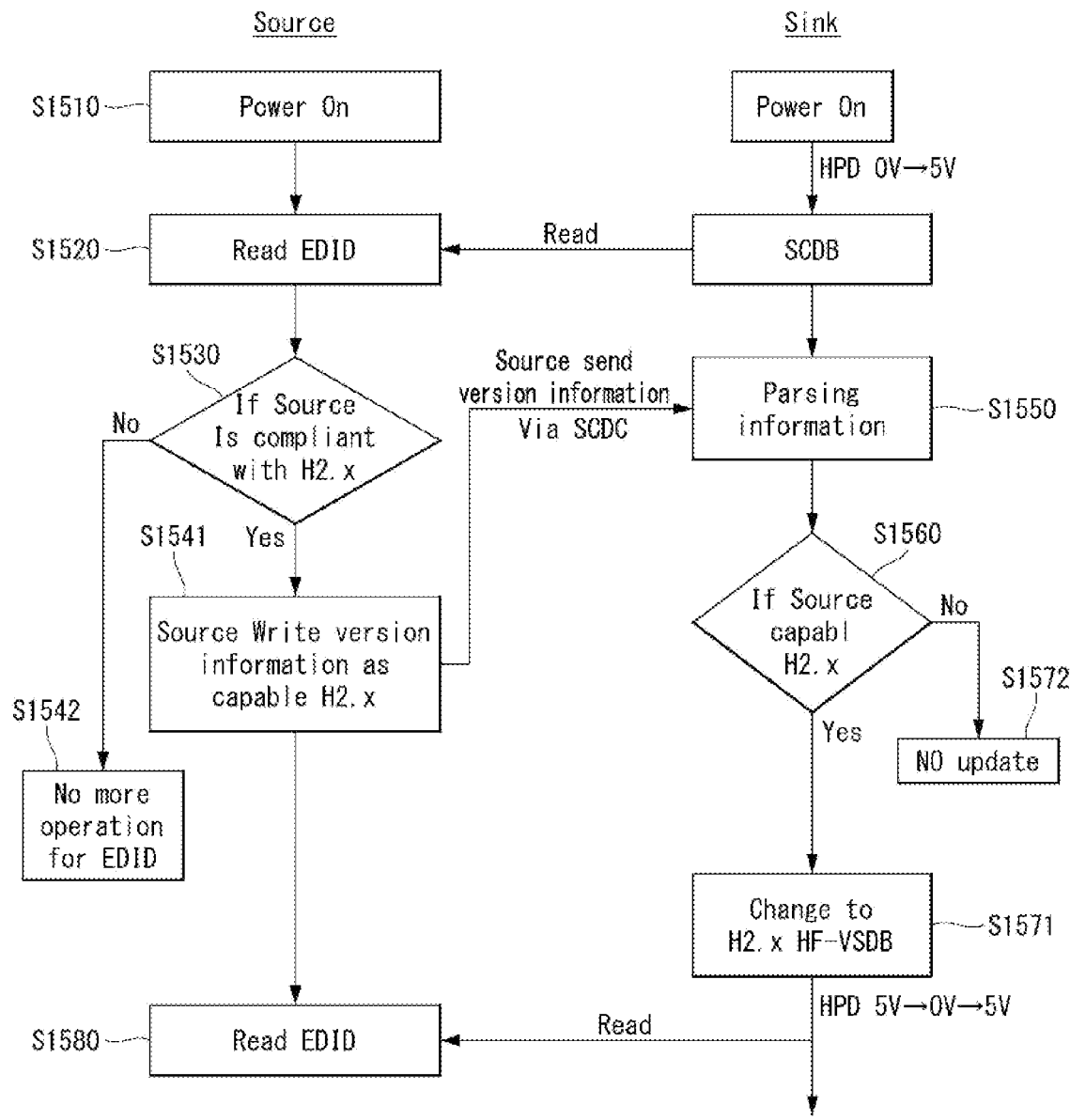
[FIG. 15]

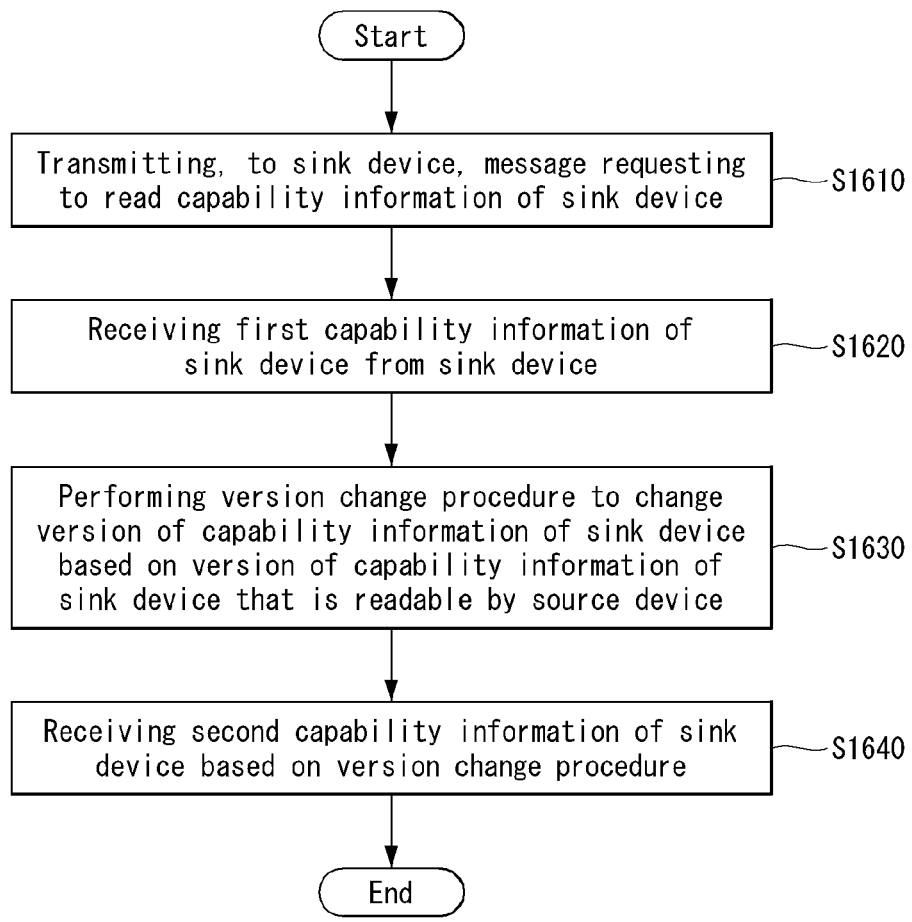
[FIG. 16]

METHOD FOR TRANSMITTING/RECEIVING VIDEO DATA AND DEVICE THEREFOR

CROSS-REFERENCE TO RELATED APPLICATIONS

This application is the National Stage filing under 35 U.S.C. 371 of International Application No. PCT/KR2022/007247, filed on May 20, 2022, which claims the benefit of earlier filing date and right of priority to Korean Application Nos. 10-2021-0064691, filed on May 20, 2021, 10-2021-0071098, filed on Jun. 1, 2021, and 10-2022-0008004, filed on Jan. 19, 2022, the contents of which are all hereby incorporated by reference herein in their entireties.

TECHNICAL FIELD

The present disclosure relates to a method for transmitting and receiving video data and a device therefor, in particular, to a method for transmitting and receiving capability information between a source device and a sink device through high definition multimedia interface (HDMI) and a device therefor.

BACKGROUND ART

High Definition Multimedia Interface (HDMI) is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software. In addition, the HDMI is available to make wirings between AV devices be simplified, which were complicated because video signals, audio signals and control signals are transmitted on only one cable, and the HDMI provides a High-bandwidth Digital Content Protection (HDCP) technique, thereby providing the copyright protection function.

DISCLOSURE

Technical Problem

The purpose of the present disclosure is to provide a method for transmitting and receiving video data and a device therefor.

In addition, the purpose of the present disclosure is to provide a method for receiving capability information from a sink device by a source device and a device therefor.

In addition, the purpose of the present disclosure is to provide a method for transmitting capability information without compatibility issues even with source devices that are incompatible with capability information provided by a sink device and a device therefor.

The technical problems to be achieved by the present disclosure are not limited to the technical problems mentioned above, and other technical problems not mentioned will be clearly understood by those skilled in the art to which the present disclosure pertains from the following descriptions.

Technical Solution

The present disclosure proposes a method for transmitting and receiving video data and a device therefor.

More specifically, in the present disclosure, a method for receiving capability information of a sink device by a source device, the method comprises transmitting, to a sink device, a message requesting to read capability information of the sink device; receiving first capability information of the sink device from the sink device: performing a version change procedure to change a version of the capability information of the sink device based on the version of the capability information of the sink device that is readable by the source device; and receiving second capability information of the sink device based on the version change procedure, wherein a version of the second capability information is a higher version than a version of the first capability information.

In addition, in the present disclosure, the first capability information may be configured to be transmitted based on a pre-configured version.

In addition, in the present disclosure, the performing the version change procedure may further comprise transmitting, to the sink device, a message to write support version information on whether the source device can read a higher version of capability information than the version of the first capability information.

In addition, in the present disclosure, based on the support version information indicating that the source device can read the higher version of capability information than the version of the first capability information: a version field of the sink device may be updated, and the receiving the second capability information may be performed.

In addition, in the present disclosure, based on the support version information indicating that the source device cannot read the higher version of capability information than the version of the first capability information: a version field of the sink device may be maintained without being updated, and the receiving the second capability information of the sink device may not be performed.

In addition, in the present disclosure, the present disclosure may further comprise receiving third capability information of the sink device from a rebooted sink device, and a version of the third capability information may be configured to be the same as any one of the version of the first ability information and the version of the second ability information.

In addition, in the present disclosure, the performing the version change procedure may further comprise transmitting, to the sink device, support version information on whether the source device can read a higher version of capability information than the version of the first capability information.

In addition, in the present disclosure, based on the support version information indicating that the source device can read the higher version of capability information than the version of the first capability information, the receiving the second capability information may be performed.

In addition, in the present disclosure, based on the support version information indicating that the source device cannot read the higher version of capability information than the version of the first capability information, the receiving the second capability information of the sink device may not be performed.

In addition, in the present disclosure, the present disclosure may further comprise receiving third capability information of the sink device from a rebooted sink device, and a version of the third ability information may be configured to be the same as any one of the version of the first ability information and the version of the second ability information.

In addition, in the present disclosure, the first capability information may be received based on a data structure in which an organizationally unique identifier (OUI) field is omitted.

In addition, in the present disclosure, the first capability information may be information constructed based on a sink capability data block (SCDB).

In addition, in the present disclosure, the performing the version change procedure may further comprise transmitting, to the sink device, support version information on whether the source device can read a higher version of capability information than the version of the first capability information.

In addition, in the present disclosure, based on the support version information indicating that the source device can read the higher version of capability information than the version of the first capability information: the receiving the second capability information may be performed, and the second capability information may be received based on a data structure including the OUI field.

In addition, in the present disclosure, the second capability information may be information constructed based on a vendor-specific data block (VSDB).

In addition, in the present disclosure, based on the support version information indicating that the source device cannot read the higher version of capability information than the version of the first capability information, the receiving the second capability information of the sink device may not be performed.

In addition, in the present disclosure, the present disclosure may further comprise receiving third capability information of the sink device from a rebooted sink device, wherein, based on the second capability information being received based on the data structure including the OUI field before rebooting the sink device, the third capability information may be received based on any one of (i) the data structure in which the OUI field is omitted and (ii) the data structure including the OUI field.

In addition, in the present disclosure, the present disclosure may further comprise based on the third capability information being received based on the data structure in which the OUI field is omitted: transmitting the support version information to the rebooted sink device; and based on the support version information indicating that the source device can read a higher version of capability information than a version of the third capability information, receiving fourth capability information based on the data structure including the OUI field from the rebooted sink device, wherein, based on the support version information indicating that the source device cannot read a higher version of capability information than the version of the third capability information, the receiving the fourth capability information may not be performed.

In addition, in the present disclosure, the present disclosure may further comprise based on the third capability information being received based on the data structure including the OUI field: transmitting the support version information to the rebooted sink device; and based on the support version information indicating that the source device cannot read a higher version of capability information than the version of the third capability information, receiving fourth capability information based on the data structure in which the OUI field is omitted from the rebooted sink device, wherein, based on the support version information indicating that the source device can read a higher version of capability information than the version of the third capability information, the receiving the fourth capability information may not be performed.

In addition, in the present disclosure, a source device that receives capability information of a sink device may comprise an HDMI transmitter; and a control unit, wherein the control unit controls to transmit, to a sink device, a message requesting to read capability information of the sink device, receive first capability information of the sink device from the sink device, perform a version change procedure to change a version of the capability information of the sink device based on the version of the capability information of the sink device that is readable by the source device, and receive second capability information of the sink device based on the version change procedure, wherein a version of the second capability information is a higher version than a version of the first capability information.

Advantageous Effects

The present disclosure has an effect of transmitting and receiving video data.

In addition, the present disclosure has an effect of allowing the source device to receive capability information from the sink device.

In addition, the present disclosure has an effect of transmitting capability information without compatibility issues even with source devices that are incompatible with capability information provided by the sink device.

In addition, the present disclosure has an effect of allowing HD and UHD (4K, 8K, 16K) functions to be utilized appropriately by both the sink device and the source device performing EDID operation appropriate for the HDMI version through information.

In addition, there is an effect that UHD (4K, 8K, 16K) image quality can be supported without any additional manipulation by the user.

Effects which can be obtained in the present disclosure are not limited to the aforementioned advantages and other unmentioned effects will be clearly understood by those skilled in the art from the following description.

DESCRIPTION OF DRAWINGS

FIG. 1 illustrates an HDMI system and data transmission and reception channels included in the HDMI system according to an embodiment of the present disclosure.

FIG. 2 illustrates a source device and a sink device in a HDMI system according to an embodiment of the present disclosure.

FIG. 3 illustrates an EDID structure according to an embodiment of the present disclosure.

FIGS. 4 to 5 illustrate an embodiment of an EDID extension block.

FIG. 6 illustrates an HF (HDMI Forum)-VSDB (Vendor-Specific Data Block) according to an embodiment of the present disclosure.

FIG. 7 illustrates HF-VSIF (HDMI Forum-Vendor Specific InfoFrame) according to an embodiment of the present disclosure.

FIG. 8 illustrates SCDC(Status and Control Data Channel) structure according to an embodiment of the present disclosure.

FIG. 9 is a diagram showing an example of HDMI-CEC operation.

FIG. 10 is a diagram showing an example of an operation in which a sink device and a source device transmit and receive signals to each other after each is turned on.

FIG. 11 is a diagram showing an example in which a method proposed in the present disclosure is performed.

FIG. 12 is a diagram showing another example in which a method proposed in the present disclosure is performed.

FIG. 13 is a diagram showing another example in which a method proposed in the present disclosure is performed.

FIG. 14 is a diagram showing another example in which a method proposed in the present disclosure is performed.

FIG. 15 is a diagram showing another example in which a method proposed in the present disclosure is performed.

FIG. 16 is a flowchart showing an example in which a method proposed in the present disclosure is performed in a source device.

MODE FOR INVENTION

Hereinafter, the configuration and operation of embodiments of the present disclosure will be described with reference to the attached drawings, and the configuration and operation of the present disclosure explained by the drawings are explained as one embodiment, and this does not limit the technical spirit of the present disclosure and its core configuration and operation.

In addition, the terms used in the present disclosure have been selected as general terms that are currently widely used as much as possible, but in specific cases, terms arbitrarily selected by the applicant are used for explanation. In such cases, the meaning is clearly stated in the detailed description of the relevant part, so it should not be simply interpreted only by the name of the term used in the description of the present disclosure, but should be interpreted by understanding the meaning of the relevant term.

Additionally, the terms used in the present disclosure are general terms selected to describe the specification, but if there are other terms with similar meaning, they may be replaced for more appropriate interpretation. For example, signals, data, information, etc. may be appropriately replaced and interpreted in each signal processing process.

FIG. 1 illustrates an HDMI system and data transmission and reception channels included in the HDMI system according to one embodiment of the present invention.

Devices that transmit and receive video/audio/control data using HDMI can be called collectively an HDMI system, and the HDMI system can comprise a source device 1010, a sink device 1020, and an HDMI cable. In the HDMI system, a device that transmits video/audio data through HDMI corresponds to the source device 1010, a device that receives video/audio data through HDMI corresponds to the sink device 1020, and an HDMI cable supporting data transmission and reception connects the two devices.

As shown in FIG. 1, the HDMI cables and the connectors may perform pairing of four channels that provides a Transition Minimized Differential Signaling (TMDS) data channel and a TMDS clock channel. The TMDS data channels may be used for forwarding video data, audio data and auxiliary data.

Additionally, the HDMI system provides a VESA (Video Electronics Standards Association) DDC (Display Data Channel). The DDC is used for configuration of one source device and one sink device and exchange of status information between them. A CEC protocol can provide a high-level control function among various audio-visual products in a user environment and may be used optionally. Also, an optional HEAC (HDMI Ethernet and Audio Return Channel) may provide Ethernet-compatible data networking among an ARC (Audio Return Channel) and connected devices in the opposite direction from a TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in serial manner with a rate of 10 bits per TMDS clock period.

In order to transmit audio data and supplementary data through the TMDS channel, the HDMI uses a packet structure. In order to attain high reliability for audio data and control data, data may be transmitted in word of 10 bits which is generated by using a BCH error correction code and an error reduction coding.

The source device can figure out configuration information and available functions of the sink device by reading out E-EDID (Enhanced Extended Display Identification Data) of the sink device in the DDC (Display Data Channel). In what follows, the E-EDID may be called EDID information.

A utility line can be used for an optional extension function such as HEAC.

FIG. 2 illustrates a source device and a sink device in a HDMI system according to an embodiment of the present invention.

In the HDMI system, the device that transmits video/audio data through HDMI corresponds to the source device 2100, and the device that receives video/audio data through HDMI corresponds to the sink device 2200.

The source device 2100 can include at least one of a display unit 2110, user input interface unit 2120, video encoding unit (video encoder) 2130, control unit 2140, HDMI transmitter 2150, memory unit 2160, storage unit 2170, multimedia unit 2180, or power supply unit 2190. The sink device 2200 can include at least one of an EDID EEPROM 2210, video decoding unit 2220, display unit 2230, user input interface unit 2240, HDMI receiver 2250, control unit 2260, power supply unit 2270, memory unit 2280, or multimedia unit 2290. In what follows, descriptions about units performing the same operation will not be repeated.

The source device 2100 represents a physical device transmitting or streaming contents stored in the storage unit to the sink device 2200. The source device 2100 can send a request message to the sink device: or receive and process a request message from the sink device. Also, the source device 2100 can provide an UI through which a response message that the sink device 2200 transmits with respect to a transmitted request message is processed and delivered to the user, and in case the source device 2100 includes the display unit 2110, the UI can be displayed.

The sink device 2200 can receive contents from the source device 2100, transmit a request message to the source device 2100, or transmit a response message by processing a message received from the source device 2100. The sink device 2200 can also provide an UI through which a response message received from the source device 2100 is processed and delivered to the user, and in case the sink device 2200 includes the display unit 2230, the UI can be displayed.

The source device 2100 and the sink device 2200 can include a user input interface unit 2120, 2240 that receives the user's action or input, and as an example, the user input interface 2120, 2240 can correspond to a remote controller, voice reception/recognition device, or touch input sensing/receiving device.

The memory unit 2160, 2280 represents a volatile physical device in which various types of data are stored temporarily.

The storage unit 2170 represents a nonvolatile physical device in which various types of data can be stored.

The EDID EEPROM 2210 represents an EEPROM that stores EDID information.

The aforementioned memory unit, storage unit, and EDID EEPROM all perform the function of storing data, which may be called collectively a memory unit.

The display unit 2110, 2230 displays data received through HDMI, data stored in a content storage, or UI on a screen according to the control of the control unit.

The multimedia unit 2180, 2290 plays various types of multimedia contents. The multimedia unit 2180, 2290 may be implemented independently of the control unit 2140, 2260 or implemented as one physical component together with the control unit.

The power supply unit 2190, 2270 supplies power required for operating a source device, sink device, and sub-units belonging to the source and sink devices.

The HDMI transmitter 2150 is the unit that is installed in the source device 2100 and transmits and receives data through HDMI. The HDMI transmitter 2150 transmits and receives data including a command between devices and a request, action, or response message as well as audio/video data.

The video encoding unit 2130 compresses video data to be transmitted through the HDMI transmitter 2150.

The HDMI receiver 2250 is the unit that is installed in the sink device 2200 and transmits and receives data through HDMI. The HDMI receiver 2250 transmits and receives data including a command between device The video decoding unit 2130 performs decompression of compressed video data received through the HDMI receiver 2250.

In what follows, channels, data structure, and functions provided by the HDMI will be described in more detail.

As described above, the HDMI system provides a DDC (Display Data Channel), which is a protocol standard defined by the VESA (Video Electronics Standard Association) specifying transmission of digital information between the monitor and the computer graphic adaptor. HDMI devices can transmit information about display modes supported by the monitor to the graphic adaptor through the DDC, and the graphic adaptor can transmit images to the monitor according to the information. Before the DDC standard is approved, the VGA standard defined four pins (Pin 11, 12, 4, and 15) of an analog VGA connector for the purpose of recognizing monitor types: among the four pins, only the pin 11, 12, and 4 have been actually used, and 7 types of monitor types could be recognized. The following provide DDC specifications for the respective versions.

DDC Version 1 (Approved in 1994)
  EDID (Extended Display Identification Data) is defined, which is a binary file format specifying monitoring information.
  Pin 12 is used as a data line, and an EDID block of 128 byte is transmitted consecutively from a monitor to a computer.

DDC Version 2 (Approved in 1996)
  EDID is no longer defined by the DDC, but specified separately as a companion standard.
  DDC version 2 is based on I2C serial bus. Pin 12 is now used as the data line, and pin 15 is used as the clock line of I2C bus.
  Pin 9 is used to supply 5V DC power (up to 50 mA) from the computer to the monitor to read the EDID stored in the EEPROM even if the monitor is powered off.
  DDC version 2 uses an 8 bit data offset and supports the EDID storage capacity ranging from 28 bytes to 256 bytes.

E-DDC
  E-DDC replaces the DDC version 1 and 2, and version 1 was introduced in 1999. To use E-EDID (Enhanced EDID), the E-DDC allows up to 32 Kbytes of display information storage capacity.
  By employing a new I2C addressing scheme based on 8-bit segment index (0x00~0x7F), 128 segments (1 segment=256 bytes) can be accessed, by which up to 32 bytes can be accessed.
  E-DDC version 1.1 was approved in 2004, which supports a video interface such as HDMI in addition to CE devices and VGA.
  E-DDC version 1.2 was approved in 2007, which supports display port and display ID In what follows, EDID provided through the DDC will be described.

FIG. 3 illustrates an EDID structure according to an embodiment of the present invention.

EDID is a data structure containing various types of information about the display device defined in the VESA and can be transmitted to the source device through the DDC channel or read by the source device. In the case of EDID, the data structure of version 1.3 has been used in the IT display device, CE display device, and video interface (HDMI).

FIG. 3 shows an overview of the information represented by the respective addresses in the EDID data structure.

FIGS. 4 to 5 illustrate an embodiment of an EDID extension block.

FIG. 4 illustrates an EDID extension block, FIG. 5(*a*) a video data block, FIG. 5(*b*) an audio data block, and FIG. 5(*c*) a speaker allocation data block.

Timing information specified in the EDID is intended for IT display devices and can use the EDID 1.3 extension block defined in the CEA-861 to represent the timing information of CE display devices. The version 3 CEA extension block is defined in the CEA-861B standard and specifies four optional data blocks (video, audio, speaker allocation, and vendor-specific data block).

In the video data block of FIG. 5(*a*), the short video descriptor represents the video identification code defined in the CEA-861. In the audio data block of FIG. 5(*b*), the short audio descriptor represents the audio format code defined in the CEA-861. In the speaker allocation data block of FIG. 5(*c*), the speaker allocation data block descriptor represents the data block payload defined in the CEA-861.

FIG. 6 illustrates an HF (HDMI Forum)-VSDB (Vendor-Specific Data Block) according to an embodiment of the present invention.

The HF-VSDB shown in FIG. 6 is the data block that defines vendor-specific data, where HDMI can define HDMI-specific data by using the data block. The HF-VSDB can be included in the E-EDID of the sink device, and in that case, it can be positioned at CEA extension version 3 within the E-EDID of the sink device.

The fields included in the HF-VSDB of FIG. 6 are described as follows.

Length field: represents the total length of the data block, of which the minimum value is 7, and the maximum value is 31.

IEEE OUI field: refers to IEEE Organizationally Unique Identifier, and the OUI assigned to the HDMI forum is 0xC45DD8.

Version field: represents the version number of the HF-VSDB (HDMI Forum-VSDB), of which the value is 1.

Max_TMDS_Character_Rate field: represents the maximum TMDS character rate supported. If the sink device does not support the maximum TMDS character rate more than 340 Mcsc, it is set to 0; otherwise, it is set to 1.

3D_OSD_Disparity: when this field is set to 1, it indicates that the sink device supports reception of 3D_OSD_Disparity Indication.

Dual_view: when this field is set to 1, it indicates that the sink device supports reception of dual_view signaling.

Independent_view field: when this field is set to 1, it indicates that the sink device supports reception of 3D independent view signaling.

LTE_340 Mcsc_scramble field: when this field is set to 1, it indicates that the sink device supports scrambling when the TMDS character rate is less than 340 Mcsc. And when the SCDC_Present is set to 0, this field also has to be set to 0.

RR_Capable field: when this field is set to 1, it indicates that the sink device can initiate an SCDC read request. And if the SCDC_Present is set to 0, this field also has to be set to 0.

SCDC_Present field: when this field is set to 1, it indicates that the sink device supports the SCDC function.

DC_48 bit_420, DC_36 bit_420, DC_30 bit_420: when these fields are set to 1, it indicates that deep color 4:2:0 pixel encoding is supported by 10 bit/12 bit/16 bit per component.

FIG. 7 illustrates HF-VSIF (HDMI Forum-Vendor Specific InfoFrame) according to an embodiment of the present disclosure.

In FIG. 7, FIG. 7(a) shows HF-VSIF packet header and FIG. 7(b) shows HF-VSIF packet content, respectively, and together they can form an infoframe. HF-FSIF is one of the infoframes, HF-VSIF packets are provided to support feature(s) requesting ancillary information to fully identify stream content, and can be transmitted from the source device to the sink device. As an example, HF-VSIF may be defined for transmission of 3D video and 2160p video.

A description of the fields included in the HF-VSIF packet header of FIG. 7(a) and the HF-VSIF packet content of FIG. 7(b) is as follows.

HF-VSIF Packet Header
Packet Type field: Indicates payload type, and HF-VSIF is distinguished by 0x81.
Version field: Version number of HF-VSIF and its value is 1.
Length field: Indicates the length of the payload.

HF-VSIF Packet Content
3D_Valid field: Indicates that there is 3D video data transmission. If configured to 1, the 3D_F_Structure, 3D_Addiotional_Info_Present, 3D_Meta_Present and 3D_F_Ext_Data fields must be activated.
3D_F_Structure field: Indicates the transmission format of 3D video data (side-by-side, top-and-bottom, etc.).
3D_Additional_Info_Present field: Configure to 1 when 3D_DualView, 3D_View Dependency and 3D_Preferred2DView information is added.
3D_Disparity_Data_Present field: Configure to 1 when 3D disparity data exists.
3D_Meta_Present field: Configure to 1 when 3D metadata exists.
3D_F_Ext_Data field: Indicates the sub-sampling method according to the transmission format of 3D video data.
3D_Dual_View field: Configure to 1 when 3D dual view exists.
3D_ViewDependency field: Indicates dependency on the coded view of right view or left view.
3D_Preferred2DView field: Indicates which 3D view is more suitable for 2D view among right 3D view and left 3D view.
3D_Disparity Data_Version field: Indicates the version of 3D disparity data.
3D_Disparity Data_length field: Indicates the length of 3D disparity data
3D_DisparityData_1~3 D_DisparityData_J fields: Describes 3D disparity data.
3D_MetaData_type field: Indicates the type of 3D metadata.
3D_MetaData_length field: Indicates the length of 3D metadata.
3D_Metadata_1~3 D_Metadata_K fields: Describes 3D metadata.

FIG. 8 illustrates SCDC(Status and Control Data Channel) structure according to an embodiment of the present disclosure.

SCDC (Status and Control Data Channel) corresponds to a point-to-point communication protocol in which a source device and a sink device exchange data. SCDC communication can use the DDC channel (line I2C) described above. In other words, SCDC is a one-to-one communication protocol based on I2C serial communication that enables data exchange between HDMI source devices and sink devices. SCDC includes a mechanism where the sink device, which is an I2C slave, requests a status check read from the source device, which is an I2C master, and the source device that receives this reads the status from the sink device.

SCDCS (SCDC Structure) may be stored in the memory of the sink device and may include data such as the structure in FIG. 8. In FIG. 8, R/W indicates whether the source device can only read or both read/write the SCDCS data stored in the sink device from the source device's perspective.

A description of the fields included in the SCDCS of FIG. 8 is as follows.

Sink Version field: Displays version information of the SCDCS compliant sink device. Configure to 1.
Source Version field: If a SCDCS compliant source device reads the E-EDID from the sink device and E-EDID's SCDC_Present=1 is configured, the Source Version of the SCDCS is configured to 1.
Update Flags (Update_0, Update_1) field: If there is a change in the information (Status, Character Error Detect, etc.) that the sink device must report to the source device, configure the corresponding bit to 1.
TMDS Configuration (TMDS_Config) field: TMDS_Bit_Clock Ratio and Scrambling_Enable each occupy 1 bit, and if the source device wants to activate the scrambling function of the sink device, configure the corresponding bit to 1. If TMDS_Bit_Clock_Ratio is 1/10, configure to 0, if it is 1/40, configure to 1.
Scrambler Status field: Configure the corresponding bit to 1 when the sink device detects a scrambled control code sequence.

Configuration (Config_0) field: As a field that configures information related to the capability of the source and sink devices, currently, there is only an RR_Enable field that can indicate whether the source device supports the Read Request of the sink device.

Status Flags (Status_Flag_0, Status_Flag_1) field: Indicates whether data received through Clock, channels 0, 1, and 2 has been successfully decoded.

Err_Det_0~2_L/H field: Indicates the LSB and MSB of the error counter detected in channels 0~3, respectively.

Err_Det_Checksum field: Implemented so that the 1-byte sum of the error detection values of the 7 registers including the checksum is 0.

Below, in order to facilitate understanding of the method proposed in the present disclosure, technical fields related to the method proposed in the present disclosure will be briefly described.

DDC (Display Data Channel)

DCC is a protocol standard for digital information transmission between a monitor and a computer's graphics adapter defined by VESA (Video Electronics Standard Association). A method is used in which display mode information that can be supported by the monitor is transmitted to the graphics adapter, and the graphics adapter transmits video to the monitor accordingly. Before the DDC standard was established, the VGA standard used four pins (Pin 11, 12, 4, and 15) of the analog VGA connector to recognize the monitor type, and among these, only Pins 11, 12, and 4 were used, and 7 types of monitor types could be recognized.

Afterwards, after the DDC version 1 standard was established, EDID (Extended Display Identification Data), a binary file format that describes monitor information, has been defined. In the DDC version 1 standard, Pin 12 can be used as a data line, and 128 byte EDID block can be continuously transmitted from the monitor to the computer.

After the DDC version 2 standard was established, EDID was not defined in DDC but was defined as an independent standard as a companion standard. EDID is defined based on I2C Serial Bus, Pin 12 is used as the data line of the I2C Bus, and Pin 15 is used as the clock line of the I2C Bus. Pin 9 is used to apply 5V DC power (up to 50 mA) from the computer to the monitor to read the EDID stored in the EEPROM even when the monitor is turned off. The monitor is a slave device of the I2C Bus and is assigned 7 bit I2C address 50h. EDID storage capacity of up to 28 bytes=256 bytes is allowed with 8 bit data offset.

E-DDC (Enhanced-Display Data Channel)

E-DDC is a standard that replaces DDC versions 1 and 2, and version 1 has been established, and E-DDC allows display information storage capacity of up to 32 Kbytes for use of Enhanced EDID. In E-DDC, a new I2C addressing scheme using 8 bit segment index (0x00~0x7F) is applied to access 128 segments (1 segment=256 bytes), allowing access to up to 32K bytes. Afterwards, E-DDC version 1.1 was established, and E-DDC version 1.1 included support for CE devices and video interfaces other than VGA (e.g. HDMI). E-DDC version 1.2, which was enacted later, further included support for Display Port and DisplayID.

EDID (Extended Display Identification Data)

EDID is a type of data structure that contains various information about the display device defined in VESA and is transmitted from the sink device to the source device. EDID versions 1.0 to 1.4 are compatible with the upper 128 bytes, and EDID versions 1.3 and higher are called Enhanced EDID, and an EDID extension block to insert additional data is added after the upper 128 bytes. It was deprecated until Version 1.2, and Version 1.3 is widely used in IT display devices, CE display devices, and video interfaces (e.g. HDMI).

Table 1 below is a table showing an example of EDID.

TABLE 1

| Address | No. Bytes | Description |
| --- | --- | --- |
| 00h~07h | 8 | Header information. Fixed to 00 FF FF FF FF FF FF 00. |
| 08h~11h | 10 | Vendor/Product identification. Manufacturer, Product code, Serial number, and Date of Manufacture |
| 12h~13h | 2 | EDID structure version/revision |
| 14h~18h | 5 | Basic Display Parameters/Features. Video input definition (analog or digital), Max. Horizontal Image Size, Max. Vertical Image Size, Display Transfer Characteristic (Gamma), Feature Support (Standby, Suspend, Display Type, Standard Default Color space (sRGB), Preferred Timing Mode support and so on) |
| 19h~22h | 10 | Color Characteristics. Information related to color and white point. Express in terms of xy-coordinaes of red, green, blue, and white in the color space. |
| 23h~25h | 3 | Established Timings. Describes commonly used timing mode |
| 26h~35h | 16 | Standard Timings. Describes 8 standard timing descriptors, and one descriptor includes information about range of horizontal active pixel, image aspect ratio, and refresh rate (60~123 Hz). Timing not belonging to the established timing is described accoridng to the VESA DMT standard or usesthe timing informaiton calculated by using GTF. |
| 36h~7Dh | 72 | Detailed Timing Descriptors. Describes detailed timing information about display resolution, and four descriptors are used. The first descriptor describes preferred detailed timing, the second descriptor describes secondary detailed timing or monitor additional information (serial number, range limites, and name). The remaining two descriptors include monitor additional information. Monitor range limit and name must be described. |
| 7Eh | 1 | Extension Flag. Specifies the number of additional EDID extensin blocks. |
| 7Fh | 1 | Checksum. |

CEA-861 EDID Extension Block

The timing information described in EDID is for IT Display devices, and the EDID 1.3 Extension Block is used in CEA-861 to display timing information of CE Display devices. Version 3 CEA Extension is defined in the CEA-861B standard, and four optional Data Blocks (Video, Audio, Speaker Allocation, Vendor Specific) are specified.

Table 2 below is a table showing an example of the CEA-861 EDID Extension Block, and Tables 3 to 5 below are tables showing examples of the video data block, audio data block, and speaker allocation data block, respectively.

TABLE 2

| Byte # | |
| --- | --- |
| 0 | Tag. 0x02 |
| 1 | Revision Number. 0x03 |
| 2 | Byte number offset d value at which Detailed Timing Descriptor (DTD) of 18 bytes starts |
| 3 | Indication of underscan, audio support, YCBCR 4:4:4 or YCBCR 4:2:2 support, the number of native DTDs supported. |
| 4 | Start of data block collection |
| d − 1 | End of data block collection |
| d | Start of 18-byte DTD. Follows the EDID DTD format |
| d + (18*n) − 1 | End of 18-byte DTD. n is the number of descriptors included |

TABLE 2-continued

| Byte # | |
|---|---|
| d + (18*n) | Beginning of Padding. 0x00 |
| 126 | End of Padding. 0x00 |
| 127 | Checksum. |

TABLE 3

| Byte # | Bits 5-7 | Bits 0-4 |
|---|---|---|
| 0 | Video Tag Code | The total number of bytes for Short Video Descriptor (1) |
| 1 | CEA Short Video Descriptor 1 | |
| L1 | CEA Short Video Descriptor L1 | |

TABLE 4

| Byte # | Bits 5-7 | Bits 0-4 |
|---|---|---|
| 0 | Audio Tag Code | The total number of bytes for Short Audio Descriptor (2) |
| 1~3 | CEA Short Audio Descriptor 1 | |
| 4~3*L2 | CEA Short Video Descriptor L2/3 | |

TABLE 5

| Byte # | Bits 5-7 | Bits 0-4 |
|---|---|---|
| 0 | Speaker allocation Tag Code | The total number of bytes for Speaker Allocation (L3 = 3) |
| 1~3 | Speaker Allocation Data Block Payload | |

FIG. 9 is a diagram showing an example of HDMI-CEC operation.

HDMI-CEC allows sink devices and source devices to connect and communicate with each other through an HDMI port. Referring to FIG. 9, audio/video data can be transmitted from the source device to the sink device through TMDS. Additionally, through CEC, CEC data can be exchanged between the sink device and the source device.

Wired connection technology indicates sink capability through EDID. That is, based on wired connection technology, the sink device transmits the capability information of the sink device to the source device. In particular, regarding the data field newly added to EDID after the release of HDMI2.0, a problem occurred where the existing Legacy Source does not recognize. More specifically, the EDID for transmitting capability information of the sink device, defined after HDMI2.0, further includes a newly added data field, but the existing source device does not recognize the data field newly added to the EDID, as a result, when transmitting the sink device's capability information through EDID defined after HDMI 2.0, there is a problem of incompatibility between the sink device and the existing source device.

In order to solve the above problem, the present disclosure indicates a method for a sink device to distinguish between a legacy source and a new source, and a technology for changing EDID information that the new device can understand through this. More specifically, the present disclosure provides (i) a method for the sink device to determine the version of the capability information of the sink device that can be read from the source device, (ii) a method for the sink device to change the version of the capability information according to the version of the capability information of the sink device that can be read by the identified source device. The sink device must prepare two EDIDs: EDID that the legacy source device can recognize (Old EDID) and EDID that the legacy source device cannot recognize (New EDID), and change operations between two EDIDs must be supported in various ways (Menu, Auto). The sink device can start the system by indicating the EDID recognized by the legacy source device. That is, the EDID capability information of the sink device that the sink device transmits for the first time may be configured to be transmitted based on a pre-configured version that is readable by the legacy source device.

First, to help understand the method proposed in the present disclosure, it will be described with reference to FIG. 10.

FIG. 10 is a diagram showing an example of an operation in which a sink device and a source device transmit and receive signals to each other after each is turned on.

First, after the source device is turned on, it transmits a 5V signal to the sink device through pin 18 (S1010).

Afterwards, the source device receives a 5V signal transmitted through pin 19 from the sink device and transmits a message requesting to read the capability information of the sink device to the sink device. In response, the source device receives capability information of the sink device configured based on EDID and EDID Extension from the sink device (S1020). At this time, transmitting a message requesting to read the capability information of the sink device and receiving the capability information may be performed based on DCC. Afterwards, the sink device does not perform additional operations for EDID (S1030).

Below, various embodiments of the methods proposed in the present disclosure will be described in detail.

Method of Updating Version Field on Sink Device

The source device that can recognize the new EDID updates the version field A indicating that it is a new device for the sink device. For example, the update operation may utilize SCDC technology in the case of HDMI, and DPCD technology in the case of Display Port. Afterwards, when the sink device confirms that the version field A has been updated, it is updated EDID that can be recognized by the new source device. If the source device is a Legacy source device, the source device does not write anything to field A of the sink device, so no update is performed, and field A of the sink device can be maintained without change. Here, when field A of the sink device is updated, the sink device re-init(1->0->1) HPD (Hot plug detect) so that the source device can read the changed EDID.

Afterwards, when the sink device is rebooted, the EDID of the sink device may operate based on two or more methods. More specifically, when the sink device is rebooted, the EDID changed before reboot may be maintained. Conversely, when the sink device is rebooted, the legacy source device may revert to recognizable EDID (Old EDID). Here, the version of capability information of the sink device transmitted based on the New EDID may be a higher version than the version of capability information of the sink device transmitted based on the Old EDID. Additionally, changes of EDID configuration between the Old EDID and the New EDID may be supported through a user menu or based on automatic recognition between devices.

FIG. 11 is a diagram showing an example in which a method proposed in the present disclosure is performed.

S1110: First, a source device and a sink device are turned on.

S1120: Afterwards, the source device reads EDID of the sink device. Here, the source device may transmit a message requesting to read the capability information of the sink device to the sink device, and receive first capability information of the sink device from the sink device. The first capability information may be configured based on EDID 1.4b version. Additionally, the first capability information may be preconfigured to be configured based on the EDID 1.4b version.

S1130: Next, the source device determines whether the source device supports HDMI 2.0 or higher. Here, if the source device is not a device that supports HDMI 2.0 or higher, the source device may not perform additional operations for EDID (S1142). Conversely, if the source device is a device that supports HDMI 2.0 or higher, the source device may write in the version field of the sink device that the source device is a device that supports HDMI 2.0 or higher (S1141). That is, the source device may transmit a message, to the sink device, to write support version information on whether the source device can read a higher version of capability information than the version of the first capability information.

S1150: Thereafter, the sink device may determine whether the source device is a device that supports HDMI 2.0 or higher based on the version field of the sink device. If the sink device determines that the source device is not a device that supports HDMI 2.0 or higher, the sink device may not perform additional operations for EDID (S1162). Conversely, if the sink device determines that the source device is a device that supports HDMI 2.0 or higher, the sink device may change the EDID based on the H1.4b version to the EDID based on the H2.0 version. The processes described in S1130, S1141, S1142, and S1150 above may be understood as an operation of performing a version change procedure to change the version of the capability information of the sink device based on the version of the capability information of the sink device that is readable by the source device.

S1170: Next, if the source device is a device that supports HDMI 2.0 or higher, the source device may read the EDID based on an EDID version changed from the sink device. That is, the source device may receive second capability information of the sink device based on the EDID version changed from the sink device. Here, a version of the second capability information may be a higher version than the version of the first capability information.

Although not shown in FIG. 11, when the sink device is rebooted after EDID of the sink device is changed to a higher version of EDID, the operation method of the sink device may be defined. More specifically, after the sink device is rebooted, the source device may read the EDID of the rebooted sink device. That is, the source device may receive third capability information of the sink device from the rebooted sink device. At this time, a version of the third capability information may be configured based on any one of EDID based on the H1.4b version and EDID based on the H2.0 version.

Method of Transmitting Support Version Information of Source Device to Sink Device The source device may utilize a method of sending information on whether the source device is a device that supports HDMI 2.0 or higher to the sink device. That is, the source device may utilize a method of sending information on the version of capability information that the source device can read to the sink device. In the present method, the sink device may start the system with Legacy EDID (HDMI1.4b EDID). Afterwards, the source device may read the H1.4b EDID of the sink device and boot it. If the source device can support the functions mentioned in the HDMI2.0 standard, the source device may transmit information indicating that the source device is an HDMI2.0 compliant device to the sink device. In order to transmit information indicating that the source device is an HDMI2.0 compliant device, for example, VSIF, EMP (Extended metadata Packet), and other source information packet data fields that can be additionally defined may be used. The source devices compatible with HDMI 2.0 or higher may require support for the method proposed in the present disclosure.

The sink device parses information on the version supported by the source device, and when it is confirmed that the source device is an HDMI 2.0 compatible device, the sink device changes the EDID to EDID compatible with HDMI 2.0 or higher. Meanwhile, if it is confirmed that the source device is not HDMI 2.0 compatible, the sink device maintains the EDID as the initially configured HDMI 1.4b EDID. After changing the EDID, the sink device turns HPD off/on (0 v->5V) and causes the source device to reread the changed H2.0-compatible EDID.

Afterwards, the sink device may be rebooted, at this time, the sink device may maintain the EDID compatible with H2.0 or higher that was changed before rebooting. Here, the sink device may save the previous state before rebooting and confirm and process it upon reboot. Conversely, after rebooting, the sink device may configure the EDID as H1.4b EDID and repeat the EDID change operation described above. The sink device may support EDID Switching (H1.4b compatible EDID↔H2.0 or higher compatible EDID) through the user menu. The sink device may support EDID Switching (H1.4b compatible EDID↔H2.0 or higher compatible EDID) through the user menu.

FIG. 12 is a diagram showing another example in which a method proposed in the present disclosure is performed.

S1210: First, a source device and a sink device are turned on.

S1220: Afterwards, the source device reads EDID of the sink device. Here, the source device may transmit a message requesting to read the capability information of the sink device to the sink device, and receive first capability information of the sink device from the sink device. The first capability information may be configured based on EDID 1.4b version. Additionally, the first capability information may be preconfigured to be configured based on the EDID 1.4b version.

S1230: Next, the source device determines whether the source device supports HDMI 2.0 or higher. Here, if the source device is not a device that supports HDMI 2.0 or higher, the source device may not perform additional operations for EDID (S1242). Conversely, if the source device is a device that supports HDMI 2.0 or higher, the source device may transmit information indicating that the source device is a device that supports HDMI 2.0 or higher to the sink device (S1241). That is, the source device may transmit, to the sink device, support version information on whether the source device can read a higher version of capability information than the version of the first capability information.

S1250, S1260: Afterwards, the sink device parses the support version information (S1250), and the sink device may determine whether the source device is a device that supports HDMI 2.0 or higher based on the support version information. If the sink device determines that the source device is not a device that supports HDMI 2.0 or higher, the sink device may not perform additional operations for EDID (S1272). Conversely, if the sink device determines that the source device is a device that supports HDMI 2.0 or higher, the sink device may change the EDID based on the H1.4b version to the EDID based on the H2.0 version. The processes described in S1230, S1241, S1242, S1250 and S1260 above may be understood as an operation of performing a version change procedure to change the version of the capability information of the sink device based on the version of the capability information of the sink device that is readable by the source device.

S1280: Next, if the source device is a device that supports HDMI 2.0 or higher, the source device may read the EDID based on an EDID version changed from the sink device. That is, the source device may receive second capability information of the sink device based on the EDID version changed from the sink device. Here, a version of the second capability information may be a higher version than the version of the first capability information.

Although not shown in FIG. 12, when the sink device is rebooted after EDID of the sink device is changed to a higher version of EDID, the operation method of the sink device may be defined. More specifically, after the sink device is rebooted, the source device may read the EDID of the rebooted sink device. That is, the source device may receive third capability information of the sink device from the rebooted sink device. At this time, a version of the third capability information may be configured based on any one of EDID based on the H1.4b version and EDID based on the H2.0 version.

Method of Using Sink Capability Data Block (SCDB)

Unlike the methods described above, the present method does not use EDID based on the H1.4b version to transmit capability information in the initial configuration of the sink device, but Sink Capability Data Block (SCDB) may be used to transmit capability information. In the present method, the source device may be forced to display version information to the sink device. At this time, for HDMI, version information is displayed using Status and Control Data (SCDS), and for DP (Display Port), version information is displayed using the DPCD. In the case of HDMI SCDS, the actual operation may be performed by the source device writing version information to the sink device. In the present method, the sink device displays capability information in EDID that the source device can basically understand. That is, the sink device may use EDID, which can also be read by legacy source devices, to transmit capability information to the source device. For example, the EDID may be based on HDMI SCDB. At this time, if the source device is a source device that can read SCDB, the sink device switches EDID to HF-VSDB. At this time, implementation of the present method may differ depending on the TV manufacturer.

In the case of the present method using Sink Capability Data Block (SCDB), compatibility issues may be eliminated by using HF-SCDB (structure with IEEE HF OUI removed) that can be read by Legacy H1.4b source devices, and Legacy 2.0 devices may display their version through SCDS access and announce that they are H2.x compatible devices. The source device may be configured to display version information certainly if the sink device is an H2.x compatible device and SCDC support is confirmed (If Sinks shows SCDC_present=1, Sources shall set(=1) Source Version in SCDC). The sink device reads the version information of the source device indicated in the SCDC, and when it is confirmed that the source device is an H2.x compatible source, it switches the EDID to HF-VSDB. Through this, the sink device can display 4K even in default mode, and compatibility issues can be eliminated as there are no EDID errors when connected to Legacy 1.4b. Afterwards, when the sink device reboots, it can boot to SCDB or maintain the changed HF-VSDB. At this time, the sink device rebooted with SCDB can maintain SCDB when connected to the H1.4b Legacy source device, and the sink device that is rebooted while maintaining HF-VSDB switches to SCDB and then performs HPD if the source device does not update version information.

Below, the present method will be described in detail with reference to the drawings.

FIG. 13 is a diagram showing another example in which a method proposed in the present disclosure is performed. More specifically, FIG. 13 relates to an example of an operation performed between a source device and a sink device before the sink device is rebooted.

S1310: First, a source device and a sink device are turned on.

S1320: Afterwards, the source device reads EDID of the sink device. Here, the source device may transmit a message requesting to read the capability information of the sink device to the sink device, and receive first capability information of the sink device from the sink device. Here, the first capability information may be configured based on EDID based on SCDB. Additionally, the first capability information may be preconfigured to be configured based on EDID based on SCDB. Additionally, the first capability information may be configured based on a data structure in which an Organizationally Unique Identifier (OUI) field is omitted.

S1330: Next, the source device determines whether the source device is a device that supports HDMI 2.0 or higher. Here, if the source device is not a device that supports HDMI 2.0 or higher, the source device may not perform additional operations for EDID (S1342). Conversely, if the source device is a device that supports HDMI 2.0 or higher, the source device may transmit information indicating that the source device is a device that supports HDMI 2.0 or higher to the sink device (S1341). That is, the source device may transmit, to the sink device, support version information on whether the source device can read a higher version of capability information than the version of the first capability information.

S1350, S1360: Afterwards, the sink device parses the support version information (S1350), and the sink device may determine whether the source device is a device that supports HDMI 2.0 or higher based on the support version information. If the sink device determines that the source device is not a device that supports HDMI 2.0 or higher, the sink device may not perform additional operations for EDID (S1372). That is, the sink device may not perform EDID update. Conversely, if the sink device determines that the source device is a device that supports HDMI 2.0 or higher, the sink device may change the EDID based on SCDB to the EDID based on HF-VSDB (S1371). The processes described in S1330, S1341, S1342, S1350 and S1360 above may be understood as an operation of performing a version change procedure to change the version of the capability information of the sink device based on the version of the capability information of the sink device that is readable by the source device.

S1380: Next, if the source device is a device that supports HDMI 2.0 or higher, the source device may read the EDID based on an EDID version changed from the sink device. That is, the source device may receive second capability information of the sink device based on the EDID version changed from the sink device. Here, the second capability information may be information configured based on EDID based on HF-VSDB. In the present disclosure, capability information configured based on EDID based on HF-VSDB may be understood as a higher version of capability information than capability information configured based on EDID based on SCDB. Additionally, the second capability information may be configured based on a data structure including an OUI field.

Below, it will be described operations performed between the source device and the sink device after the sink device is rebooted.

Although not shown in FIG. 13, when the sink device is rebooted after EDID of the sink device is changed to EDID based on HF-VSDB, the operation method of the sink device may be defined. More specifically, after the sink device is rebooted, the source device may read the EDID of the rebooted sink device. That is, the source device may receive third capability information of the sink device from the rebooted sink device. At this time, the version of the third capability information may be configured based on any one of EDID based on HF-VSDB and EDID based on SCDB.

FIG. 14 is a diagram showing another example in which a method proposed in the present disclosure is performed. More specifically, FIG. 14 relates to a case where the EDID of the sink device is configured as EDID based on HF-VSDB if the sink device is rebooted after the EDID of the sink device is changed to EDID based on HF-VSDB.

S1410: First, a source device and a sink device are turned on.

S1420: Afterwards, the source device reads EDID of the sink device. Here, the source device may transmit a message requesting to read the capability information of the sink device to the sink device, and receive first capability information of the sink device from the sink device. Here, the capability information may be configured based on EDID based on HF-VSDB. Additionally, the capability information may be configured based on a data structure that includes an Organizationally Unique Identifier (OUI) field.

S1430: Next, the source device determines whether the source device supports HDMI 2.0 or higher. Here, if the source device is a device that supports HDMI 2.0 or higher, the source device may not perform additional operations for EDID (S1442). Conversely, if the source device is not a device that supports HDMI 2.0 or higher, the source device may transmit information indicating that the source device is not a device that supports HDMI 2.0 or higher to the sink device (S1441). That is, the source device may, to the sink device, transmit support version information on whether the source device can read capability information of the same or higher version as the version of capability information configured based on the EDID based on the HF-VSDB.

S1450, S1460: Afterwards, the sink device parses the support version information (S1450), and the sink device may determine whether the source device is a device that supports HDMI 2.0 or higher based on the support version information. If the sink device determines that the source device is a device that supports HDMI 2.0 or higher, the sink device may not perform additional operations for EDID (S1472). That is, the sink device may not perform EDID update. Conversely, if the sink device determines that the source device is a device that does not support HDMI 2.0 or higher, the sink device may change the EDID based on HF-VSDB to the EDID based on SCDB (S1471). The processes described in S1430, S1441, S1442, S1450 and S1460 above may be understood as an operation of performing a version change procedure to change the version of the capability information of the sink device based on the version of the capability information of the sink device that is readable by the source device.

S1580: Next, if the source device is a device that does not support HDMI 2.0 or higher, the source device may read the EDID based on an EDID version changed from the sink device. That is, the source device may receive capability information of the sink device based on the EDID version changed from the sink device. Here, the capability information may be information configured based on EDID based on SCDB. In the present disclosure, capability information configured based on EDID based on HF-VSDB may be understood as a higher version of capability information than capability information configured based on EDID based on SCDB. Additionally, the capability information configured based on EDID based on the SCDB may be configured based on a data structure in which the OUI field is omitted.

FIG. 15 is a diagram showing another example in which a method proposed in the present disclosure is performed. More specifically, FIG. 15 relates to a case where the EDID of the sink device is configured as EDID based on SCDB if the sink device is rebooted after the EDID of the sink device is changed to EDID based on HF-VSDB.

S1510: First, a source device and a sink device are turned on.

S1520: Afterwards, the source device reads EDID of the sink device. Here, the source device may transmit a message requesting to read the capability information of the sink device to the sink device, and receive first capability information of the sink device from the sink device. Here, the capability information may be configured based on EDID based on SCDB. Additionally, the capability information may be configured based on a data structure in which an Organizationally Unique Identifier (OUI) field is omitted.

S1530: Next, the source device determines whether the source device supports HDMI 2.0 or higher. Here, if the source device is not a device that supports HDMI 2.0 or higher, the source device may not perform additional operations for EDID (S1542). Conversely, if the source device is a device that supports HDMI 2.0 or higher, the source device may transmit information indicating that the source device is a device that supports HDMI 2.0 or higher to the sink device (S1541). That is, the source device may transmit, to the sink device, support version information on whether the source device can read a higher version of capability information than the version of the capability information.

S1550, S1560: Afterwards, the sink device parses the support version information (S1550), and the sink device may determine whether the source device is a device that supports HDMI 2.0 or higher based on the support version information. If the sink device determines that the source device is not a device that supports HDMI 2.0 or higher, the sink device may not perform additional operations for EDID (S1572). That is, the sink device may not perform EDID update. Conversely, if the sink device determines that the source device is a device that support HDMI 2.0 or higher, the sink device may change the EDID based on SCDB to the EDID based on HF-VSDB (S1571). The processes described in S1530, S1541, S1542, S1550 and S1560 above may be understood as an operation of performing a version change procedure to change the version of the capability information of the sink device based on the version of the capability information of the sink device that is readable by the source device.

S1580: Next, if the source device is a device that does not support HDMI 2.0 or higher, the source device may read the EDID based on an EDID version changed from the sink device. That is, the source device may receive capability information of the sink device based on the EDID version changed from the sink device. Here, the capability information may be information configured based on EDID based on HF-VSDB. In the present disclosure, capability information configured based on EDID based on HF-VSDB may be understood as a higher version of capability information than capability information configured based on EDID based on SCDB. Additionally, the capability information may be configured based on a data structure including an OUI field.

The methods proposed in the present disclosure have the effect of improving connection compatibility performance with source devices that do not recognize the EDID compatible with H2.0 or higher generated in the standard. In addition, both the sink device and the source device perform EDID operation appropriate for the HDMI version through information, so HD and UHD (4K, 8K, 16K) functions can be utilized appropriately. In addition, there is an effect that allows users to use UHD (4K, 8K, 16K) TV without direct manipulation through functions such as menus.

FIG. 16 is a flowchart showing an example in which a method proposed in the present disclosure is performed in a source device.

First, a source device transmits, to the sink device, a message requesting to read capability information of the sink device (S1610).

Afterwards, the source device receives first capability information of the sink device from the sink device (S1620).

Next, the source device performs a version change procedure to change a version of the capability information of the sink device based on the version of the capability information of the sink device that is readable by the source device (S1630).

Finally, the source device receives second capability information of the sink device based on the version change procedure. Here, a version of the second capability information is a higher version than a version of the first capability information.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

It is obvious to those skilled in the art that the present disclosure can be embodied in other specific forms without departing from the essential features of the present disclosure. Accordingly, the above detailed description should not be construed as restrictive in all respects and should be considered illustrative. The scope of the present disclosure should be determined by reasonable interpretation of the appended claims, and all changes within the scope of equivalents in the present disclosure are included within the scope of the present disclosure.

INDUSTRIAL APPLICABILITY

Above, the preferred embodiments of the present disclosure described above are disclosed for illustrative purposes, and those skilled in the art will be able to improve, change, replace, or add various other embodiments within the technical spirit and technical scope of the present disclosure disclosed in the appended claims.

What is claimed is:

1. A method for receiving capability information of a sink device by a source device, the method comprising:
    transmitting, to a sink device, a message requesting to read capability information of the sink device;
    receiving first capability information of the sink device from the sink device,
    wherein the first capability information is configured to be based on a pre-configured version,
    wherein the first capability information is received based on a data structure in which an organizationally unique identifier (OUI) field is omitted;
    performing a version change procedure to change a version of the capability information of the sink device based on the version of the capability information of the sink device that is readable by the source device,
    wherein performing the version change procedure comprises transmitting, to the sink device, support version information on whether the source device can read a higher version of capability information than the version of the first capability information; and
    receiving second capability information of the sink device based on the version change procedure,
    wherein a version of the second capability information is a higher version than a version of the first capability information.

2. The method of claim 1, wherein the performing the version change procedure further comprises transmitting, to the sink device, a message to write support version information on whether the source device can read a higher version of capability information than the version of the first capability information.

3. The method of claim 2, wherein, based on the support version information indicating that the source device can read the higher version of capability information than the version of the first capability information:
 a version field of the sink device is updated, and
 the receiving the second capability information is performed.

4. The method of claim 2, wherein, based on the support version information indicating that the source device cannot read the higher version of capability information than the version of the first capability information:
 a version field of the sink device is maintained without being updated, and
 the receiving the second capability information of the sink device is not performed.

5. The method of claim 2, further comprising:
 receiving third capability information of the sink device from a rebooted sink device, and
 a version of the third capability information is configured to be the same as any one of the version of the first capability information and the version of the second capability information.

6. The method of claim 1, wherein the performing the version change procedure further comprises
 transmitting, to the sink device, support version information on whether the source device can read a higher version of capability information than the version of the first capability information.

7. The method of claim 6, wherein, based on the support version information indicating that the source device can read the higher version of capability information than the version of the first capability information, the receiving the second capability information is performed.

8. The method of claim 6, wherein, based on the support version information indicating that the source device cannot read the higher version of capability information than the version of the first capability information, the receiving the second capability information of the sink device is not performed.

9. The method of claim 6, further comprising:
 receiving third capability information of the sink device from a rebooted sink device, and
 a version of the third capability information is configured to be the same as any one of the version of the first capability information and the version of the second capability information.

10. The method of claim 1, wherein the first capability information is information constructed based on a sink capability data block (SCDB).

11. The method of claim 1, wherein, based on the support version information indicating that the source device can read the higher version of capability information than the version of the first capability information:
 the receiving the second capability information is performed, and
 the second capability information is received based on a data structure including the OUI field.

12. The method of claim 11, wherein the second capability information is information constructed based on a vendor-specific data block (VSDB).

13. The method of claim 1, wherein, based on the support version information indicating that the source device cannot read the higher version of capability information than the version of the first capability information,
 the receiving the second capability information of the sink device is not performed.

14. The method of claim 11, further comprising:
 receiving third capability information of the sink device from a rebooted sink device,
 wherein, based on the second capability information being received based on the data structure including the OUI field before rebooting the sink device,
 the third capability information is received based on any one of (i) the data structure in which the OUI field is omitted and (ii) the data structure including the OUI field.

15. The method of claim 14, further comprising:
 based on the third capability information being received based on the data structure in which the OUI field is omitted:
 transmitting the support version information to the rebooted sink device; and
 based on the support version information indicating that the source device can read a higher version of capability information than a version of the third capability information,
 receiving fourth capability information based on the data structure including the OUI field from the rebooted sink device,
 wherein, based on the support version information indicating that the source device cannot read a higher version of capability information than the version of the third capability information,
 the receiving the fourth capability information is not performed.

16. The method of claim 14, further comprising:
 based on the third capability information being received based on the data structure including the OUI field:
 transmitting the support version information to the rebooted sink device; and
 based on the support version information indicating that the source device cannot read a higher version of capability information than the version of the third capability information,
 receiving fourth capability information based on the data structure in which the OUI field is omitted from the rebooted sink device,
 wherein, based on the support version information indicating that the source device can read a higher version of capability information than the version of the third capability information,
 the receiving the fourth capability information is not performed.

17. A source device that transmits video data using high definition media interface (HDMI) comprising:
 an HDMI transmitter; and
 a control unit,
 wherein the control unit controls to:
 transmit, to a sink device, a message requesting to read capability information of the sink device,
 receive first capability information of the sink device from the sink device,
 wherein the first capability information is configured to be based on a pre-configured version,
 wherein the first capability information is received based on a data structure in which an organizationally unique identifier (OUI) field is omitted,
 perform a version change procedure to change a version of the capability information of the sink device based on the version of the capability information of the sink device that is readable by the source device, wherein performing the version change procedure comprises transmitting, to the sink device, support version information on whether the source device can read a higher version of capability information than the version of the first capability information; and receive second capability information of the sink device based on the version change procedure, wherein a version of the second capability information is a higher version than a version of the first capability information.

* * * * *